United States Patent [19]

Matsuo et al.

[11] Patent Number: 5,510,406

[45] Date of Patent: Apr. 23, 1996

[54] FLUOROPOLYMER COMPOSITION FOR COATING AND ARTICLE COATED WITH THE SAME

[75] Inventors: Masashi Matsuo; Masaru Yamauchi, both of Kanagawa; Nobuko Matsunaga, Tokyo; Shunsuke Yokotsuka; Masao Unoki, both of Kanagawa, all of Japan

[73] Assignee: Asahi Glass Company, Ltd., Tokyo, Japan

[21] Appl. No.: 240,504

[22] Filed: May 9, 1994

Related U.S. Application Data

[63] Continuation of Ser. No. 698,078, May 10, 1991, abandoned.

[30] Foreign Application Priority Data

Jun. 1, 1990 [JP] Japan ..................................... 2-141578

[51] Int. Cl.$^6$ .................................................... C08K 5/17
[52] U.S. Cl. ........................... 524/237; 524/252; 524/367; 524/462; 524/544; 524/545; 525/104
[58] Field of Search ..................................... 524/545, 237, 524/252, 367, 462, 544; 525/104

[56] References Cited

U.S. PATENT DOCUMENTS

| | | | |
|---|---|---|---|
| 3,303,145 | 2/1967 | Carlson | 260/2 |
| 4,314,043 | 2/1982 | Kojima | 525/104 |
| 4,804,709 | 2/1989 | Takago et al. | 525/102 |
| 4,897,457 | 1/1990 | Nakamura et al. | 526/247 |
| 4,910,276 | 3/1990 | Nakamura et al. | 526/247 |
| 5,021,602 | 6/1991 | Clement et al. | 558/230 |

FOREIGN PATENT DOCUMENTS

| | | |
|---|---|---|
| 1237782 | 3/1967 | Germany . |
| 9015082 | 12/1990 | WIPO . |

*Primary Examiner*—Peter D. Mulcahy
*Attorney, Agent, or Firm*—Oblon, Spivak, McClelland, Maier, & Neustadt

[57] ABSTRACT

A fluoropolymer composition for coating, which comprises a polymer having a fluorine-containing cycloaliphatic structure and at least one coupling group in its molecule and a solvent for dissolving said polymer.

11 Claims, No Drawings

FLUOROPOLYMER COMPOSITION FOR COATING AND ARTICLE COATED WITH THE SAME

This application is a continuation of application Ser. No. 07/698,078, filed on May 10, 1991, now abandoned.

The present invention relates to a fluoropolymer composition suitable for coating and to its use.

Fluororesins are excellent in various properties such as solvent resistance, low dielectric property, low surface energy property, non-adhesivity and weather resistance, and they are accordingly used in various fields where commodity plastics can not be used. In many cases, although the surface properties of the fluororesins are highly appreciated, most of the fluororesins are insoluble in a solvent and therefore can not be used for coating. Thus, they are processed into products by cutting processing, melt processing and the like, which require very high manufacturing costs.

Although polyvinylidene fluoride is known to be soluble in a polar solvent such as dimethylformamide at a high temperature, a usable solvent is quite limited and the solubility of the resin therein is still too low to obtain a uniform and transparent coating film.

Since a fluororesin has a non-adhesive property, it is hardly adherable to a substrate. In order to remove this inconvenience, the substrate is subjected to roughening treatment or the fluororesin is etched with Na/naphthalene.

Recently, a fluororesin comprising a copolymer of fluoroolefin with vinyl ether or vinyl ester, which is soluble in commodity solvents, has been developed, and is used as a coating agent, a paint and the like. However, this resin is a copolymer of a fluorine-containing monomer and a non-fluoromonomer, and therefore this resin is not always satisfactory in respect of the specific properties of a fluororesin such as solvent resistance, non-adhesivity and low refractivity.

On the other hand, examples of a fluoropolymer having a cyclic structure on the main chain obtained by cyclic polymerization of perfluoro-diene are disclosed in "SPE Trans", 3, 231 (1963) and "American Chem. Soc., Polymer Preprints", 7, 1, 112 (1966). However, these synthesis methods of the polymer have disadvantages that irradiation operation by γ-ray under a high pressure is required and that the resins thus obtained are too poor in solubility in a solvent to prepare a satisfactory resin solution suitable for coating. Thus, these fluoropolymers obtained by these methods were not used as a fluororesin solution for coating.

Moreover, even though the above polymer solution was coated on an inorganic substrate such as glass, ceramics, silicon, aluminum, copper, silver and stainless steel, or an organic substrate such as plastic and rubber, its adhesivity to the substrate was not always satisfactory and was not suitable for practical uses.

An object of the present invention is to overcome the above-mentioned disadvantages.

Thus, the present invention is to dissolve the above-mentioned problems and to provide a fluoropolymer composition for coating, which comprises a polymer of a fluorine-containing cycloaliphatic structure having at least one coupling group in its molecule and a solvent for dissolving said polymer.

The fluoropolymer contained in the composition of the present invention has a cycloaliphatic structure, examples of which are illustrated by the following general formulas.

The general formula (i):

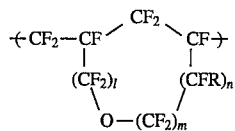

wherein l is 0 to 5; m is 0 to 4; n is 0 to 1; l+m+n is 1 to 6 and R is F or $CF_3$.

The general formula (ii)

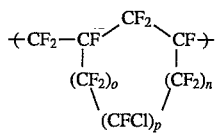

wherein each of o, p and q is 0to5 and o+p+q is 1 to 6.

The general formula (iii):

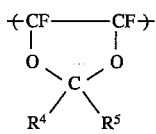

wherein $R^4$ is F or $CF_3$, and $R^5$ is F or $CF_3$.

Among the above-mentioned cyclic structures, typical examples include polymers having the following cyclic structures, but the present invention is not limited thereto.

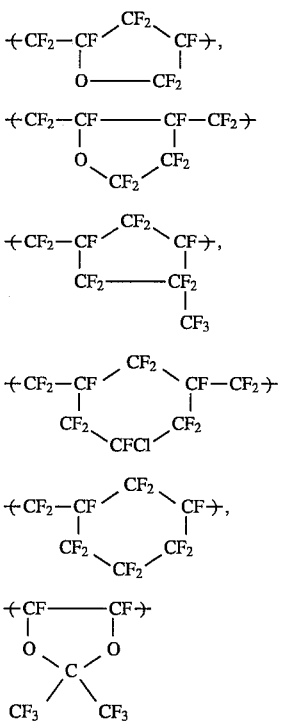

There are two types of processes for preparing the above polymers as illustrated below, but the present invention is not limited to these processes.

1. Process by cyclic polymerization (1) $CF_2=CF-O-CF_2CF_2-O-CF=CF_2$

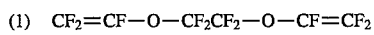

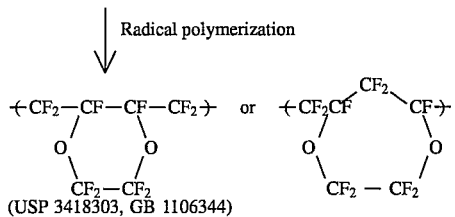
(USP 3418303, GB 1106344)

(2) $CF_2=CF-CF_2-CFCl-CF_2-CF=CF_2$

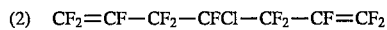

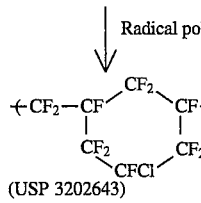
(USP 3202643)

(3) $CF_2=CF-O-CF_2-CF=CF_2$

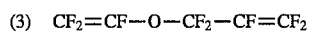

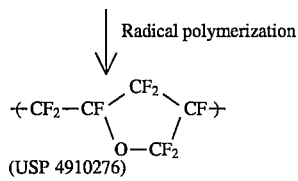
(USP 4910276)

2. Process by using cyclic monomer

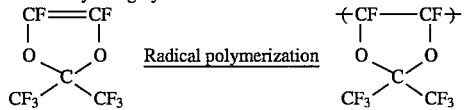

In the above examples, a polymer having a perfluorocycloaliphatic structure was illustrated, but the present invention includes polymers wherein a part of fluorine atoms in the above examples is substituted with a hydrogen atom and/or an organic group, or polymers having a cyclic structure obtained by metathesis polymerization as illustrated below.

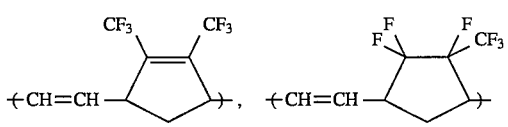

Thus, the polymer having the specific cyclic structure used in the present invention can be obtained smoothly and efficiently by the above-mentioned cyclic polymerization. Particularly, by using a monomer having two types of polymerizable groups of different polymerizability in the same molecule (the linear chain portion of a linking chain connecting the two different types of polymerizable groups has an atom number of from 2 to 7), the cyclic polymerization can proceed smoothly and efficiently while inhibiting gelling without using ultra-high pressure conditions and highly diluted conditions.

As mentioned above, monomers suitable for cyclic polymerization should preferably satisfy the following two conditions.

The first condition is to have two carbon-carbon multiple bonds of different polymerizability. A typical example is a carbon-carbon double bond. There are enumerated fluoromonomers having two multiple bonds of asymmetric structure; e.g. a Vinyl group and an allyl group; a vinyl ether group and a vinyl group; a fluorine-containing multiple bond and a hydrocarbon multiple bond; and a perfluoromultiple bond and a partially fluorinated multiple bond.

The second condition is that the linear chain portion of a linking chain connecting two carbon-carbon multiple bonds preferably has a atom number of from 2 to 7. If the atom number of the linear chain portion of the linking chain is 0-1, or not less than 8, the cyclic polymerization hardly occurs. Generally, the atom number is preferably from 2 to 5. Also, the linking chain is not limited to a linear type, but may have a side chain structure or cyclic structure. Furthermore, atoms constituting the linking chain may comprise not only carbon atoms but also heteroatoms such as O, S and N.

The third condition is that the fluorine content is preferably not less than 10% by weight. If the fluorine content is too small, the specificity derived from fluorine atoms is hardly achieved. As a matter of fact, a perfluoromonomer can be satisfactorily used.

Examples of the above-mentioned specific fluoromonomers are enumerated below.

$CF_2=CFOCF_2CF=CF_2$, $CF_2=CFOCF_2CF_2CF=CF_2$ $CF_2=CFOCF_2CFCF=CF_2$, $CF_2=CFOCF_2OCF_2CF=CF_2$
$\phantom{CF_2=CFOCF_2}|$
$\phantom{CF_2=CFOCF_2}CF_3$

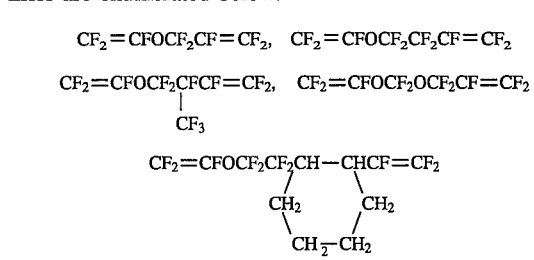

$CF_2=CFOCF_2CF=CH_2$, $CF_2=CFOCF_2CF_2CH=CH_2$, $CF_2=CFOCF_2(CH_2)_xNHCCH=CH_2$
$\phantom{CF_2=CFOCF_2(CH_2)_xNHCC}\|$
$\phantom{CF_2=CFOCF_2(CH_2)_xNHCC}O$
(wherein x is an integer of from 0 to 3)

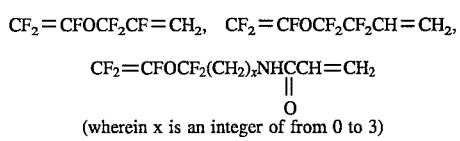

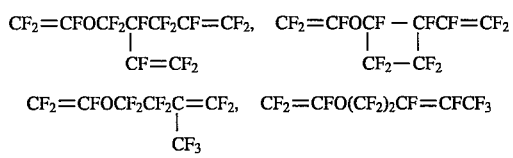

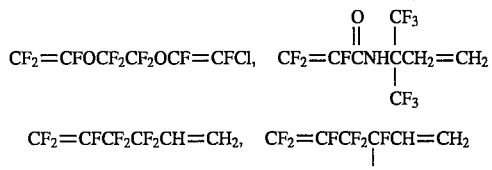

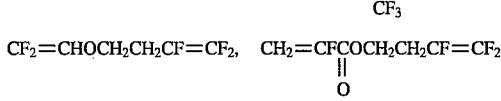

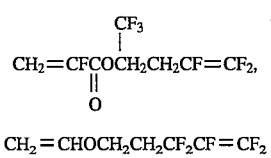

$CH_2=CHOCH_2CH_2CF_2CF=CF_2$

In the present invention, a monomer having one vinyl ether group expressed by $CF_2=CFO-$ is preferable in respect of polymerization reactivity, cyclic polymerizability and inhibition of gelation, preferable examples of which include perfluoroallylvinyl ether ($CF_2=CFOCF_2CF=CF_2$) and perfluorobutenylvinyl ether ($CF_2=CFOCF_2CF_2CF=CF_2$).

The above-mentioned monomer components may be used alone or in a mixture of two or more, or may also be used in combination with other copolymerizable components so long as the presence of the other copolymerizable components does not impair the essential properties of the original monomer components.

Examples of copolymerizable monomers to be copolymerized are not limited but may include any of radical polymerizable monomers such as various fluorine-containing type and hydrocarbon type monomers. As a matter of fact, these copolymerizable monomers may be used alone or in a mixture of two or more kinds in the radical copolymerization with the above-mentioned monomers which enable the introduction of the specific cyclic structure. In the present invention, general examples of the above-mentioned copolymerizable monomers include fluorine-containing monomers such as fluoroolefin and fluorovinyl ether. More particular examples include tetrafluoroethylene, perfluoromethylvinyl ether, perfluoropropylvinyl ether, or a perfluorovinyl ether having a functional group such as a carboxylic or sulfonic group, and further vinylidene fluoride, vinyl fluoride and chlorotrifluoroethylene.

In order to make the best use of the essential feature of the present invention, i.e. the specific properties derived from the cycloaliphatic structure of the fluoropolymer, the amount of the cyclic structure should preferably be not less than 20%, more preferably not less than 40% in the copolymer composition.

Since the fluoropolymer used in the composition of the present invention has a coupling group, a coating film firmly adhered to a substrate can be obtained without losing transparency. The adhesivity can not be improved satisfactorily simply by adding a coupling agent to a solution of a polymer having a fluorine-containing cycloaliphatic structure. Also, a method for treating a substrate surface with a coupling agent is not satisfactory in respect of durability such as water resistance, and the characteristic properties of the polymer having the fluorine-containing cycloaliphatic structure, such as low dielectric constant, are not efficiently available.

The coupling group used in the present invention is a group having the formula $-MR^1_{n-a}R^2_a$ wherein M is selected from the group consisting of Si, Ti, Zr, Hf, Th and Al; $R^1$ is selected from the group consisting of a halogen group, a hydroxyl group, an amino group and $-OR^3$ ($R^3$ is a monovalent organic group); $R^2$ is a monovalent organic group; n is 2 or 3; and a is 0, 1 or 2 (provided that a is 0 or 1 when n is 2). It is considered that the satisfactory adhesivity can be obtained since the coupling group has a group of $-MR^1$ highly reactive with an inorganic substrate.

Preferable examples of $R^1$ include a halogen group such as chlorine and fluorine, a hydroxyl group, an alkoxy group, an alkoxy-substituted alkoxy group, a hydroxyalkyloxy group, an acyloxy group, an aminoxy group, a ketoxime group, an amino group and an amide group. Particularly, when considering various prperties of the composition such as stability, reactivity with an inorganic substrate and influence by a by-produced material, an alkoxy group having a carbon number of from 1 to 4 is preferable. When such an alkoxy group is present, the composition have a satisfactory stability and a material by-produced during coating does not substantially have any bad influence. As far as $R^1$ is selected from the above enumerated groups, $R^1$'s bonded with one M may comprise two different kinds.

Among the above enumerated members, M is preferably Si, Ti, Zr or Al since precursors of the other members are hardly available. Particularly, when M is Si, a very strong adhesivity to an inorganic substrate can be obtained without losing transparency.

$R^2$ is a monovalent organic group, but $-MR^2$ is not always necessary to be reactive. Examples of $R^2$ include an alkyl group, an aryl group and the like, the carbon number of which is preferably from 1 to 10.

Examples of these coupling groups include a trimethoxysilyl group, a triethoxysilyl group, a methyl dimethoxysilyl group, a triethoxytitanium group, a tributoxyzirconium group, a trimethoxyhafnium group and the like.

An example of a method for introducing a coupling group into a fluoropolymer comprises reacting a fluoropolymer having a carboxyl group, an alkoxycarbonyl group, a hydroxyl group and the like with a compound having the formula $X-MR^1_{3-a}R^2_a$ (wherein X is an alkyl group or a vinyl group having at least one functional atom or group selected from the group consisting of a chlorine atom, an amino group, an aminoalkyl group, a ureide group, a glycidoxy group, an epoxy group, an isocyanate group and an acryloyl group, and M, $R^1$, $R^2$ and a are the same as defined above).

A fluoropolymer having a reactive group can be prepared in the same manner as in the preparation of the fluoropolymer having the above-mentioned fluorine-containing cycloaliphatic structure. That is, the fluoropolymer having the reactive group such as $-CH_2COOH$ and $-CH_2COOH_3$ at the terminal can be obtained by polymerizing the fluoropolymer having the fluorine-containing cycloaliphatic structure in the presence of an initiator of an ordinary organic peroxy compound.

A reactive group can be positively introduced by copolymerizing with a monomer having a reactive group such as $CF_2=CFOCF_2CF(CF_2)O-(CF_2)_3-COOH_3$ in the preparation of the fluoropolymer having the fluorine-containing cycloaliphatic structure.

A coupling group can be introduced by reacting a compound having the above-mentioned coupling group with a fluoropolymer having the above-mentioned reactive group. Such a reaction can be preferably conducted at a temperature of from 10° to 50° C. for from 2 to 5 hours.

A coupling group may also be introduced by copolymerizing a monomer having a coupling group with a radical polymerizable group such as vinyltrimethoxysilane and vinyltriethoxysilane in the preparation of the fluoropolymer having the fluorine-containing cycloaliphatic structure.

When the amount of the coupling group introduced is too small, the adhesivity is not satisfactorily improved. On the contrary, when the amount of the coupling agent introduced is too large, the original properties of the fluoropolymer having the fluorine-containing cycloaliphatic structure are degraded and the stability of the composition becomes poor, thus resulting in gelation. Accordingly, it is preferable to appropriately select the amount of the coupling group introduced, depending on its object. Generally, the adhesivity is improved when one coupling group is introduced per molecule of a polymer. It is not necessary for improving the adhesivity that all of the fluoropolymers having the fluorine-containing cycloaliphatic structures present in the composition have a coupling group. For example, the adhesivity can be satisfactorily improved if at least about 1/20 of the fluoropolymers having the fluorine-containing cycloaliphatic structures present in the composition is a polymer having at least one coupling group.

A fluoropolymer having a fluorine-containing cycloaliphatic structure used in the present invention should preferably have an intrinsic viscosity (hereinafter referred to as [η]) of from 0.1 to 0.5 dl/g, more preferably from 0.2 to 0.35 dl/g, measured at 30° C. in perfluoro(2-butyl-tetrahydrofuran). If the value of [η] is too small, mechanical strength at normal temperature or at a high temperature becomes unfavorably low. On the contrary, if the value of [η] is too large, the viscosity of a coating solution becomes unfavorably high and the coating operation becomes difficult.

Examples of a solvent used for dissolving a fluoropolymer having a fluorine-containing cycloaliphatic structure in the present invention include a polyfluoroaromatic compound such as perfluorobenzene; a tri(polyfluoroalkyl)amine such as perfluorotripropyl amine, perfluorotributyl amine and perfluorotripentyl amine; a polyfluoroalkane such as perfluorohexane, perfluorooctane, (perfluoro-n-octyl)ethane and perfluoro(2,3,5-trimethylhexane); a polyfluoroalkene such as (perfluoro-n-octyl)ethylene and hexafluoropropylenetrimer; a polyfluorocycloalkane such as perfluorocyclohexane and perfluorodecalin; and polyfluorocyclic ether such as perfluoro(2-butyl-tetrahydrofuran), and the like. The above-mentioned solvent may be used alone or in a mixture of two or more. Also, a chlorofluorocarbon such as trichlorotrifluoroethane and dichlorodifluoromethane; a hydroclorofluorocarbon such as dichlorotetrafluoropropane; and other organic solvents such as a low molecular fluorine-containing polyether, a hydrocarbon and an alcohol may be used as a mixture solvent.

When a solvent having a high boiling point is used as a solvent, the evaporation speed becomes low, thereby producing a smooth and uniform coating film. On the contrary, when a solvent having a low boiling point is used, the viscosity of the coating composition becomes low, thereby improving coating workability. Thus, a solvent is selected depending on its use. Generally, a solvent having a boiling point of not less than 50° C., more preferably not less than 150° C., is favorably used. The upper limit of the boiling point of the solvent used is not specially limited, but is generally about 250° C. However, the boiling point of the solvent used is too high, it becomes unsuitable for coating.

If a fluoropolymer having a fluorine-containing cycloaliphatic structure is contained at a concentration of at least 0.1% by weight in the composition of the present invention, a coating film can be produced. It is not necessary that all of the fluoropolymer having the fluorine-containing cycloaliphatic structure have a coupling group. As mentioned above, a satisfactory adhesion can be achieved if at least 1/20, preferably 1/10 of the fluoropolymer has a coupling group. The concentration of the fluoropolymer having the fluorine-containing cycloaliphatic structure used herein means the total concentration of a polymer having a coupling group and a polymer having no coupling group.

When the concentration of the fluoropolymer having the fluorine-containing cycloaliphatic structure is made lower, a thin coating film can be prepared. On the contrary, the concentration of the fluoropolymer having the fluorine-containing cycloaliphatic structure is made larger, a thick coating film Can be prepared. Thus, the concentration is appropriately selected depending on its use, but is generally from 0.1 to 30% by weight, preferably from 0.5 to 20% by weight.

In the composition of the present invention, it is preferable that the contents of an acidic substance such as hydrofluoric acid and an acidic group such as a carboxyl group and a sulfonic group are as little as possible. If these acidic substance and acidic group are present in a large amount, electric properties and water resistance of the coating film obtained are degraded and the coated surface is liable to be corroded. Also, if the acidic substance and the acidic group are present in a large amount, the stability of a coupling group is lowered, and viscosity increase and gelation tend to occur during the reaction of introducing the coupling group or during the preparation or preservation of the composition. Thus, it is preferable for increasing the stability of the composition to control the contents of the acidic substance and the acidic group to the degree of not higher than 10 ppm, particularly not higher than 5 ppm.

Examples of the acidic substance and the acidic group present in the composition include an inorganic acid such as hydrofluoric acid and hydrochloric acid, an organic acid derived from an initiator, a surfactant and the like, and a carboxyl group, a sulfonic acid group and the like bonded with a polymer. Therefore, an alkoxycarbonyl group is more preferable than a carboxyl group as the reactive group in a polymer. It is also possible to add an acid-receiving agent such as a trialkylamine in order to improve the stability of the composition.

The composition of the present invention may be coated by any of ordinary coating methods including a coating method using a brush, a doctor blade, a bar coater or a flow coater, a spray coating method, a spin coating method and the like, Among the above methods, the spin coating method is preferable when a coated film is required to have a satisfactory smoothness.

An article coated with the composition of the present invention is excellent in various properties such as low dielectric constant, low reflectivity, transparency and chemical resistance.

The composition containing the fluoropolymer of the present invention has various uses as a coating material for an optical fiber, a lens, a solar cell, a mirror, an optical disk, a touch panel, a semiconductor element, a hybrid IC, a liquid crystal cell, a printed circuit board, a photosensitive drum, a film condenser, a glass window and various films in the optical or electric field; a coating material for an injector, a pipet, a thermometer, a breaker, a laboratory dish and a measuring cylinder in the medical or chemical field; and other uses including a solder mask, a solder resist, a protective, weather-resistant and stain-proofing Coating for rubbers and plastic, a protective coating for fibers, clothes and foils, a stain-proofing coating for a sealant, an IC sealant, a stain-proofing paint, a protective agent for resin-deposition and a protective agent for ink-staining. Among the above-mentioned uses, the composition of the present invention is particularly useful for an optical fiber cladding material, a coating material for an optical window and the like Which require transparency.

Also, the composition of the present invention can be favorably used as an insulating film or a protective film between layers used in semiconductor elements or integrated circuit devices, thereby producing quickly responsive semiconductor elements or integrated circuit devices of less error operations, which make the most of such inherent properties of a fluororesin as a low water absorbency, a low dielectric constant and a high heat resistance.

EXAMPLES

The present invention will be described in detail with reference to typical Examples. However, it should be understood that the present invention is by no means restricted to such specific Examples.

SYNTHESIS EXAMPLE 1

Synthesis of fluoropolymer A-1

35 g of perfluoroallylvinyl ether, 5 g of trichlorotrifluoroethane (hereinafter referred to as "R113"), 150 g of ion exchanged water and 35 mg of $(C_3F_7COO)_2$ as a polymerization initiator, were charged in a pressure-resistant glass made autoclave of 200 ml. The atmosphere of the autoclave was substituted with nitrogen for three times, and suspension polymerization was then conducted at 26° C. for 23 hours, thus obtaining 28 g of a polymer.

Upon measurement of the infrared ray absorption spectrum of this polymer, there could be observed no absorption in the vicinities of 1660 cm$^{-1}$ and 1840 cm$^{-1}$ to be derived from the double bonds which were present in the starting monomeric substance, but there could be observed absorption in the vicinity of 1810 cm$^{-1}$ derived from —COOH.

Further, when this polymer was dissolved in perfluorobenzene and its $^{19}$F NMR spectrum was measured, there was obtained the spectrum which indicated the following repeating structure.

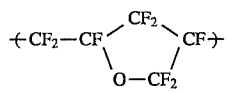

—COOH groups present in the fluoropolymer thus obtained were substituted with —COOCH$_3$ groups. 3.5 g of the polymer thus obtained was dissolved in 46.5 g of a perfluoro(2-butyl-tetrahydrofuran) and 0.1 g of N-β-aminoethyl-γ-aminopropyltrimethoxysilane was added to the resultant solution. The atmosphere in the autoclave was substituted with N$_2$, and the contents were stirred at room temperature for 3 hours to obtain fluoropolymer A-1.

Upon measurement of the infrared ray absorption spectrum of the above obtained polymer, there could be observed no absorption in the vicinity of 1800 cm$^{-1}$ to be derived from —COOCH$_3$ which was present in the original fluoropolymer, but there could be observed absorption in the vicinity of 1730 cm$^{-1}$ derived from —CONH—. The value of intrinsic viscosity [η] was 0.32 dl/g.

SYNTHESIS EXAMPLE 2

Synthesis of fluoropolymer A-2

The same procedure as in Synthesis Example 1 was repeated, except that N-β-aminoethyl-γ-aminopropyltrimethoxysilane was replaced by glycidoxypropyltrimethoxysilane to obtain fluoropolymer A-2. The fluoropolymer thus obtained had a [η] value of 0.32 dl/g.

SYNTHESIS EXAMPLE 3

Synthesis of fluoropolymers A-3 and A-4

50 g of perfluorobutenylvinyl ether, 7 g of R113, 210 g of ion exchanged water, 30 g of methanol and 130 mg of diisopropylperoxydicarbonate as a polymerization initiator, were charged in a pressure-resistant glass made autoclave of 300 ml. The atmosphere in the autoclave was substituted with nitrogen for three times, and suspension polymerization was conducted at 40° C. for 23 hours, thus obtaining 40 g of polymer A-3. The polymer thus obtained had a [η] value of 0.30 dl/g.

Upon measurement of the infrared ray absorption spectrum of this polymer, there could be observed no absorption in the vicinities of 1660 cm$^{-1}$ and 1840 cm$^{-1}$ to be derived from the double bonds which were present in the starting monomeric substance. Further, when this polymer was subjected to $^{19}$F NMR spectrum measurement, there was obtained the spectrum which indicated the presence of a cyclic structure in the same manner as in Synthesis Example 1.

—COOH groups present in the fluoropolymer thus obtained were substituted with —COOCH$_3$ groups. 4 g of the resultant polymer was dissolved in 58 g of perfluorotributyl amine. The resultant solution was heated at 50° C. for 10 hours for effecting dehydrofluorination to obtain a solution having a free fluorine ion concentration of not more than 1 ppm. 0.05 g of γ-aminopropyltrimethoxysilane was added to the resultant solution. The atmosphere of the autoclave was substituted with nitrogen, add the above prepared solution was stirred at room temperature for 3 hours to obtain fluoropolymer A-4.

Upon measurement of the infrared ray absorption spectrum of this polymer, the absorption in the vicinity of 1800 cm$^{-1}$ to be derived from —COOCH$_3$ was 20% reduced in comparison with the original fluoropolymer, and there could be observed the absorption in the vicinity of 1730 cm$^{-1}$ to be derived from —CONH—.

The above prepared polymer A-3 had 10% heat decomposition temperature of 475° C., a water absorbency of not more than 0.01%, a dielectric constant at 23° C. of 2.2 (60 Hz - 1 MHz), a volume resistance of not less than 10$^{17}$ and a [η] value of 0.30 dl/g.

EXAMPLES 1 to 5

Fluoropolymer-containing compositions for coating were prepared by using the fluoropolymers A-1 and A-2 synthesized in the above Synthesis Examples 1 and 2 as shown in the following Table 1.

Each of the fluoropolymer-containing compositions thus prepared was coated on a glass plate by means of a bar coater, and was heat-dried to obtain a transparent coating having a thickness of 5μ.

The adhesivity of the coating film to the glass plate was evaluated by crosscut test (JIS D0202 4.15). The adhesivity was evaluated in the same manner as above also after dipping the test piece in a boiling water for 2 hours. The results are shown in the following Table 2.

COMPARATIVE EXAMPLE

The same procedure as in Example 1 was repeated, except that N-β-aminoethyl-γ-aminopropyltrimethoxysilane was not added in the synthesis of the fluoropolymer A-1 of the present invention.

TABLE 1

| Example No. | | 1 | 2 | 3 | 4 | 5 |
|---|---|---|---|---|---|---|
| Fluoropolymer | A-1 | 7 | 9 | | 9 | |
| | A-2 | | | 9 | | 9 |
| Perfluoro- | B-1 | 93 | 91 | | 91 | |
| solvent | B-2 | | | 91 | | 91 |

Numerals in the above Table mean parts by weight.

TABLE 1-continued

| Example No. | 1 | 2 | 3 | 4 | 5 |
|---|---|---|---|---|---|
| B-1: perfluoro(2-butyl-tetrahydrofuran) | | | | | |
| B-2: perfluorotributyl amine | | | | | 5 |

TABLE 2

| Example No. | 1 | 2 | 3 | 4 | 5 | Comparative Example 1 |
|---|---|---|---|---|---|---|
| Initial adhesivity | 100 | 100 | 100 | 100 | 100 | 0 |
| Adhesivity after dipping in boiling for 2 hrs. | 100 | 100 | 100 | 100 | 100 | 0 |

Numerals in the above Table mean the number of the remaining crosscut coating films by crosscut test (JIS D0202 4.15). Maximum 100, Minimum 0

EXAMPLE 6

Cladding Material for Optical Fiber

The following fluoropolymer-containing composition was used as a cladding material for optical fiber by coating on silica fiber.

| Fluoropolymer-containing composition: | |
|---|---|
| Fluoropolymer A-2: | 9 parts by weight |
| Perfluoro-solvent B-2: | 91 parts by weight |
| 2Properties of optical fiber | |
| Core diameter | 200µ |
| Clad diameter | 225µ |
| Transmission loss | 4 dB/km at 850 nm |
| Opening number | 0.51 |
| Fiber strength | 15 kg |

Since the fluoropolymer Used in the present invention has a high fluorine content, it has a low refractive index and a high transparency, and accordingly, it has excellent properties as a cladding material for optical fiber. Furthermore, since it has an excellent adhesivity to a core material, a transmission loss by peeling off at the interface is very little.

EXAMPLES 7 to 11

Fluoropolymer-containing compositions were prepared by using respective fluoropolymers A-1, A-2 and A-4 synthesized in the above synthesis Examples 1, 2 and 3 as shown in the following Table 3. These compositions thus prepared were stable and any viscosity increase was not recognized even after preservation at 50° C. for 10 hours. These fluoropolymer-containing compositions were respectively coated on various substrates by spin coating at 2000 rpm, and were heat-dried at 80° to 180° C. for one hour to obtain smooth coating films. As the substrate, glass, silicon, silicon nitride and aluminum were respectively used. These coating films on the substrates were subjected to moisture-resistance test to evaluate their adhesivities to the substrates. The evaluation of the adhesivity was conducted in accordance with JIS D0202 4.15. The adhesivity was evaluated at the initial stage and after the moisture resistance test. The conditions of the moisture resistance test (pressure cooker test: PCT) were 125° C. and 2.3 arms. The results are shown in the following Tables 4 to 7. The numerals in the Tables indicate the number of crosscut pieces remained on the substrate.

COMPARATIVE EXAMPLE 2

A comparative composition for coating was prepared by using the fluoropolymer A-3 synthesized in the above Synthesis Example 3 as shown in the following Table 3. The comparative composition thus obtained was evaluated with regard to its adhesivity in the same manner as in Examples 7 to 11, and the results are shown in the following Tables 4 to 7.

TABLE 3

| Example No | | 7 | 8 | 9 | 10 | 11 | Comparative Example 2 |
|---|---|---|---|---|---|---|---|
| Polymer | A-1 | 7 | 9 | — | — | — | — |
| | A-2 | — | — | 9 | — | — | — |
| | A-3 | — | — | — | — | — | 9 |
| | A-4 | — | — | — | 7 | 9 | — |
| Solvent | | 93 | 91 | 91 | 93 | 91 | 91 |

Numerals in the above Table mean part by weight, and the solvent is a perfluorotributyl amine.

TABLE 4

(Substrate: glass)

| Example No. | | 7 | 8 | 9 | 10 | 11 | Comparative Example 2 |
|---|---|---|---|---|---|---|---|
| PCT time (hr) | 0 | 100 | 100 | 100 | 100 | 100 | 0 |
| | 100 | 100 | 100 | 100 | 100 | 100 | 0 |
| | 200 | 100 | 100 | 100 | 100 | 100 | 0 |
| | 300 | 100 | 100 | 100 | 100 | 100 | 0 |

TABLE 5

(Substrate: silicon)

| Example No. | | 7 | 8 | 9 | 10 | 11 | Comparative Example 2 |
|---|---|---|---|---|---|---|---|
| PCT time (hr) | 0 | 100 | 100 | 100 | 100 | 100 | 10 |
| | 100 | 100 | 100 | 100 | 100 | 100 | 0 |
| | 200 | 100 | 100 | 100 | 100 | 100 | 0 |
| | 300 | 100 | 100 | 100 | 100 | 100 | 0 |

TABLE 6

(Substrate: silicon nitride)

| Example No. | | 7 | 8 | 9 | 10 | 11 | Comparative Example 2 |
|---|---|---|---|---|---|---|---|
| PCT time (hr) | 0 | 100 | 100 | 100 | 100 | 100 | 10 |
| | 100 | 100 | 100 | 100 | 100 | 100 | 0 |
| | 200 | 100 | 100 | 100 | 100 | 100 | 0 |
| | 300 | 100 | 100 | 100 | 100 | 100 | 0 |

TABLE 7

(Substrate: aluminum)

| Example No. | | 7 | 8 | 9 | 10 | 11 | Comparative Example 2 |
|---|---|---|---|---|---|---|---|
| PCT time (hr) | 0 | 100 | 100 | 100 | 100 | 100 | 100 |
| | 100 | 100 | 100 | 100 | 100 | 100 | 60 |
| | 200 | 100 | 100 | 100 | 100 | 100 | 10 |
| | 300 | 100 | 100 | 100 | 100 | 100 | 0 |

As mentioned above, the fluoropolymer composition of the present invention is excellent in various properties such as solvent resistance, chemical resistance, low surface energy property, low refractive index, low water absorbency, low dielectric constant and high heat resistance, which are derived from the inherent properties of a fluororesin, and easily provides a highly transparent coating film firmly adhered to a substrate.

What is claimed is:

1. A fluoropolymer composition for coating, which comprises:

(A) a polymer having a fluorine-containing cycloaliphatic ether-cyclic structure of an at least 5-membered ring containing at least one group of the formula —$MR^1_{n-a}R^2_a$, wherein M is a member selected from the group consisting of Si, Ti, Zr, Hf, Th and Al; $R^1$ is a member selected from the group consisting of halogen, hydroxyl, amino group, alkoxy, alkoxy-substituted alkoxy, hydroxyalkoxy, acyloxy, aminoxy, ketoxime and amide group; $R^2$ is alkyl or aryl; n is 2 or 3; and a is 1 or 2, provided that a is 0 or 1 when n is 2, and (B) a solvent for dissolving said polymer.

2. The fluoropolymer composition for coating according to claim 1, wherein said polymer having a fluorine-containing cycloaliphatic structure has a cyclic structure on the main chain.

3. The fluoropolymer composition for coating according to claim 1, wherein said polymer having a fluorine-containing cycloaliphatic structure has a cyclic structure obtained by cyclic polymerization on the main chain.

4. The fluoropolymer composition for coating according to claim 1, wherein said polymer having a fluorine-containing cycloaliphatic structure is a polymer having a cyclic structure obtained by cyclic polymerization of at least one monomer selected from the group consisting of perfluoroallylvinyl ether and perfluorobutenylvinyl ether.

5. The fluoropolymer composition for coating according to claim 1, wherein M is Si; $R^1$ is a $C_{1-4}$ alkoxy group; n is 3; and a is 0.

6. The fluoropolymer composition for coating according to claim 1, wherein said solvent includes at least a solvent having a boiling point of from 50° C. to 250° C.

7. The fluoropolymer composition for coating according to claim 1, wherein said solvent is at least one member selected from the group consisting of a polyfluoroaromatic compound, a tri(polyfluoroalkyl)amine, a polyfluoroalkane, a polyfluoroalkene, a polyfluorocycloalkane and a polyfluorocyclic ether.

8. The fluoropolymer composition for coating according to claim 1, wherein the concentration of said polymer having a fluorine-containing cycloaliphatic structure is from 0.1 to 30% by weight.

9. The fluoropolymer composition for coating according to claim 8, wherein at least 1/20 of said polymer having a fluorine-containing cycloaliphatic structure is a polymer having a coupling group.

10. The fluoropolymer composition for coating according to claim 1, wherein an amount of an acidic material or acidic group contained in said composition is not more than 10 ppm.

11. The fluoropolymer composition for coating according to claim 10, wherein said acidic material or acidic group is a carboxyl or sulfonic group bonded with said polymer, an organic acid or an inorganic acid.

* * * * *